United States Patent [19]

Stäuble et al.

[11] Patent Number: 5,074,624
[45] Date of Patent: Dec. 24, 1991

[54] BOGIE VEHICLE WITH ELECTROHYDRAULIC BRAKES AND HYDROPNEUMATIC SUSPENSION

[75] Inventors: Georg Stäuble, Munich, Fed. Rep. of Germany; Claude Thiaville, Aulnoy, France; Heinz Völbel; Tiberius Wieser, both of Munich, Fed. Rep. of Germany

[73] Assignees: Knorr-Bremse AG; Compagnie Industrielle De Materiel De Transport, both of Munich, Fed. Rep. of Germany

[21] Appl. No.: 417,630

[22] Filed: Oct. 5, 1989

[30] Foreign Application Priority Data

Oct. 5, 1988 [DE] Fed. Rep. of Germany ....... 3833922

[51] Int. Cl.$^5$ .......................... B60T 17/00; B61F 5/14
[52] U.S. Cl. .................................. 303/3; 105/198.3; 280/714; 303/7
[58] Field of Search ...................... 363/7, 1, 3, 8, 22.6, 363/22.7, 15, 2, 20, 116, D3, D4; 280/707, 714; 105/180.1, 198.3

[56] References Cited

U.S. PATENT DOCUMENTS

| | | | |
|---|---|---|---|
| 2,147,327 | 2/1939 | Williams | 303/22.6 |
| 3,439,631 | 4/1969 | Cope | 105/198.3 |
| 4,030,777 | 6/1977 | Rabenseifner | 280/714 |
| 4,143,925 | 3/1979 | Young | 280/714 |
| 4,230,374 | 10/1980 | King | 303/22.6 |
| 4,453,777 | 6/1984 | Newton | 303/22.6 |
| 4,708,225 | 11/1987 | Feldman et al. | 303/DIG. 4 |
| 4,807,944 | 2/1989 | Weise | 303/176 |
| 4,831,532 | 5/1989 | Kondo | 280/707 |

Primary Examiner—Matthew C. Graham
Attorney, Agent, or Firm—Pollock, Vande Sande & Priddy

[57] ABSTRACT

The railborne bogie vehicle with electrohydraulic brakes and hydropneumatic leveling suspension has in each of its bogies a hydraulic pressure supply unit (9) from which pressure control valves (15, 16) parallel to each other provide pressure to both the hydraulic brakes (19) and the hydropneumatic suspension (20) of that bogie. The back pressure lines (26 and 32) of the electrohydraulic brakes (19) or of the hydropneumatic suspension (20) lead to a hydraulic tank or sump (10) associated with the pressure supply unit (9).

7 Claims, 2 Drawing Sheets

BOGIE VEHICLE WITH ELECTROHYDRAULIC BRAKES AND HYDROPNEUMATIC SUSPENSION

FIELD OF THE INVENTION

The invention is a railborne bogie vehicle with electrohydraulic brakes and hydropneumatic, leveling suspension. Such railborne bogies vehicles are known as vehicles guided on rails by means of wheel flanges, but also by means of guide boards, special guide rails or guide cables or rails by contact-sensitive or even non-contact probe driven vehicles.

BACKGROUND OF THE INVENTION

Electrohydraulic brakes for bogie vehicles are already known, which brakes have in one component a hydraulic pressure supply unit with a hydraulic tank or sump, a motor-driven pump drawing thereon and a hydraulic accumulator, a pressure control switch for turning the set of pumps on and off as well as a manually activatable bleeder valve for emptying the pressure accumulator into the hydraulic tank or sump. The unit additionally comprises a preferably electrically controllable control device which controls the admission of hydraulic pressure from the pressure accumulator or the pressure release into the hydraulic tank or pump for each of the brake cylinders which work directly or indirectly and are assigned to a bogie of the bogie vehicle, preferably by means of magnetic valves. Such a unit is provided for each bogie of the bogie vehicle. The suspension of this bogie vehicle has to date consisted of the usual steel or air suspensions, a separate supply of air pressure being necessary for the latter.

For vehicles, hydropneumatic suspensions are generally known which include a pressure supply unit with a pump set with or without a pressure accumulator, a control device controlled from the vertical distance of the suspended vehicle car to the rail, vehicle axle, or bogie frame, as well as suspension cylinders whose hydraulic contents are monitored by the control device, with integrated or separate bladder accumulators. The control device can be constructed as a mechanical leveling valve or as an electrical or electronic control device with hydraulic material controlled by magnetic valves. The bladder accumulators of the suspension cylinders in general have a pressure bladder separated by a membrane and filled with nitrogen. In such suspensions it is common to cushion the shocks differently and furthermore to allow adjustments only during particular periods, depending on door openings or closings, for example, or depending on driving conditions. The pressure supply of these suspensions normally results from an internal pressure supply unit.

SUMMARY OF THE INVENTION

It is the object of the invention to create a railborne bogie vehicle of the above-named type with reduced cost and effort for the construction of the electrohydraulic brakes as well as the hydropneumatic suspension.

This object is accomplished by providing for each bogie a hydraulic pressure supply unit from which both the electrohydraulic brakes and the hydropneumatic suspension for such bogie are supplied with pressure through parallel valves for protection against pressure losses.

BRIEF DESCRIPTION OF THE DRAWINGS

Examples of embodiments for bogie vehicles constructed according to the invention are presented in the drawings and show.

DESCRIPTION OF PREFERRED EMBODIMENT

Figure 1:
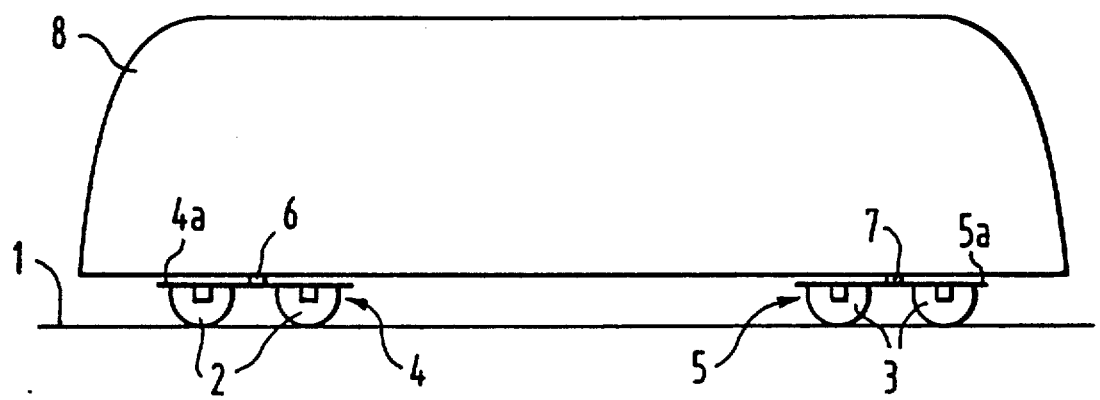
FIG. 1 is an elevation showing the general construction of a bogie vehicle.

The bogie vehicle of the above-mentioned type, shown in FIG. 1, stands on a track 1 which comprises rails, concrete beams, or even a more or less level driving surface. The wheels 2 and 3 are formed into groups, each group being borne in a bogie 4 or 5 with a bogie frame 4a or 5a. The vehicle casting 8 is supported on the bogie frames 4a and 5a via hydraulic suspension cylinders 6 or 7.

Figure 2:
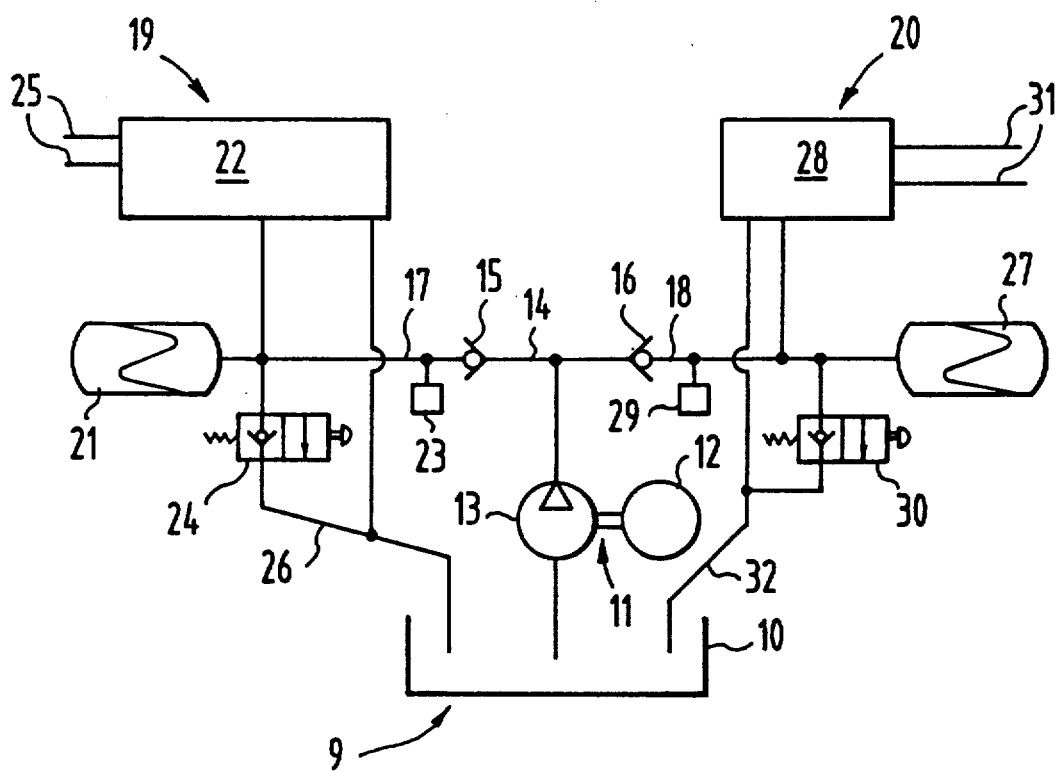
FIG. 2 is a schematic diagram of portions of the electrohydraulic brakes and hydropneumatic suspension for a bogie.

Each bogie 4 and 5 contains a device of the type shown in FIG. 2. This device includes a hydraulic pressure supply unit 9, consisting of a pressureless hydraulic tank or sump 10 from which a pump set feeds hydraulic material under pressure into a supply line 14 by means of a pump 13 driven by an electric motor 12. A supply line 17 or 18 is attached to the supply line 14 by a valve for protection against pressure loss formed as back pressure valve 15 or 16, of which one (17) leads to an electrohydraulic brake 19 and the other (18) leads to an hydropneumatic suspension 20. On the side of the electrohydraulic brake 19, the supply line 19 is attached to a pressure accumulator 21, a control device 22, a pressure control switch 23, and a manually activatable bleeder valve 24 which is closed when in rest position. Output lines 25 lead from the control device 22, preferably electrically controllable by (not shown) lines and devices to brake application cylinders in FIG. 2, of the associated friction brakes, which are likewise not shown in FIG. 2, of the wheels of each of the bogies 4 and 5. A common back pressure line 26 leads from the control device 22 and the bleeder valve 24 to the hydraulic tank or sump. The control device 22 preferably contains magnetic valves by which the output line 25 or accumulator is hydraulically drainable or into which the back pressure line 26 can be voided. The supply line 18 on the side of the hydropneumatic suspension 20 is similarly attached to a pressure accumulator 27, a control device 28, a pressure control switch 29 and a bleeder valve 30. Output lines 31 lead from the control device 28 to hydraulic suspension cylinders (not shown in FIG. 2) of each of the bogies. The control device 28 is preferably controlled electrically by vertical condition sensors (not shown), which measure the vertical distance between the vehicle casing 8 and each of the bogie frames 4a or 5a (FIG. 1) or which measure a corresponding vertical distance. The admission of hydraulic pressure from the supply line 18 or the pressure accumulator 27 controls the output lines 31 or draining into a back pressure line 32, preferably by means of magnetic valves contained in it. The bleeder valve 30 is attached on its output side to the back pressure line 32 leading to the hydraulic tank or sump 10.

The pressure control switches 23 and 29 monitor the turning on and off of the electric motor 12 for the pump 13 in parallel, the pressure control switch 23 having a lower cut-in pressure, of 120 bar, for example, than the pressure control switch 29, with 140 bar, for example. The cut-off pressure switch of both pressure control switches 23 and 29 is at least approximately the same, it can be at 150 bar, for example. The pump 13 becomes active, then, at a lack of cut-in pressure of the pressure control switch 23 (140 bar) and loads the accumulators 21 and 27 up to cut-off pressure (150 bar) via the supply line 14 as well as the back pressure valves 15 and 16. If the pressure in the supply line 17 with the pressure accumulator 21 should drop below the cut-in pressure of the pressure control switch 23 (120 bar) because of corresponding braking, however, while in pressure accumulator 27 there is still pressure above the cut-in value of the pressure control switch 29, then the pressure control switch 23 turns pump 13 on and does not turn it off until the cut-off (150 bar) pressure is reached so that both pressure accumulators 21 and 27 are loaded to this level of cut-off pressure.

It can be seen that only one pressure supply unit 9 is necessary on each bogie 4 or 5 for both the electrohydraulic brakes and hydropneumatic suspension, a second set of pumps or compressors previously necessary for automatic bogie pressure supply for brakes and suspension being superfluous.

Figure 3:
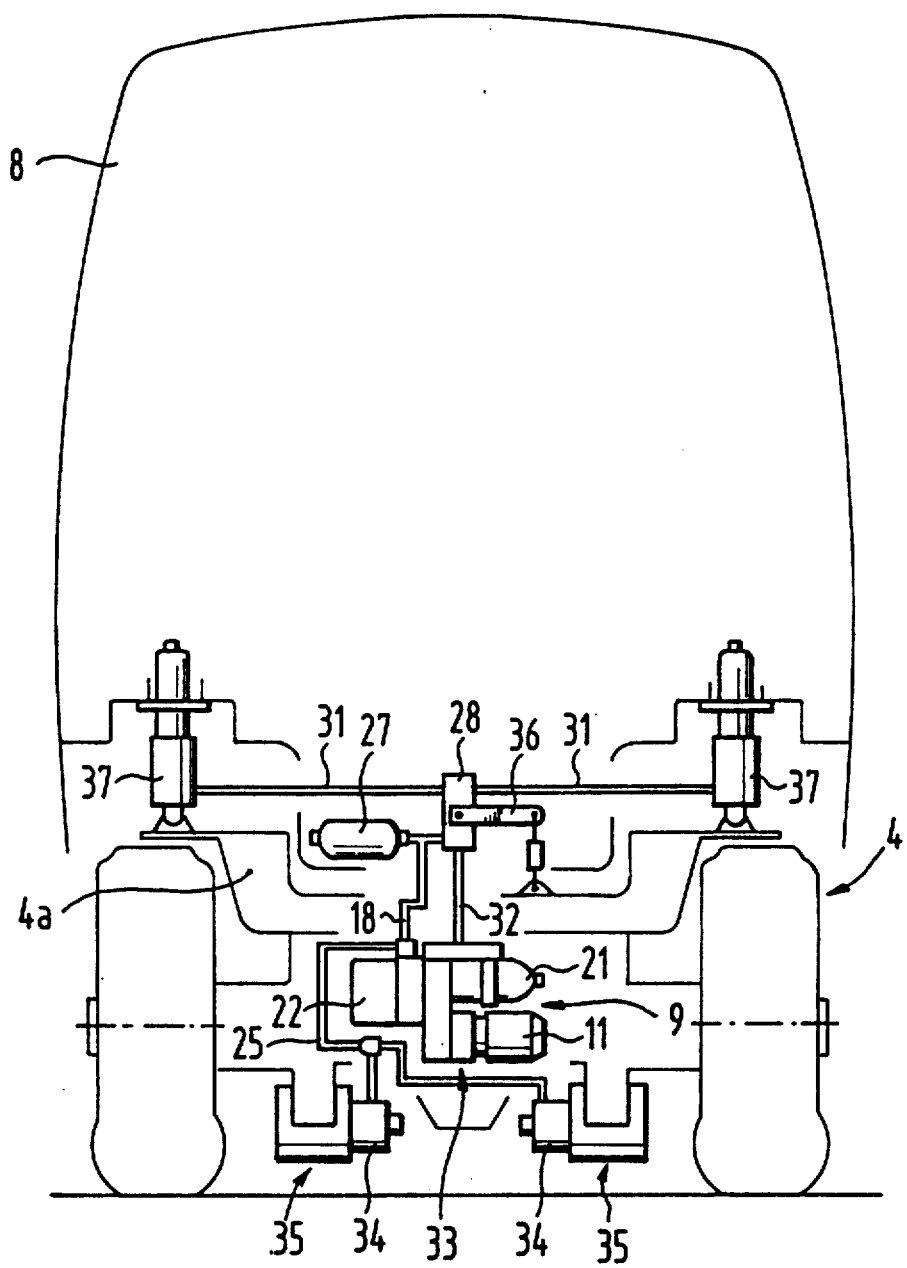
FIG. 3 shows schematically a possible arrangement of the brakes and suspension in a bogie vehicle.

It can be useful to configure the bogie vehicle according to the schematic cross-section shown in FIG. 3. According to FIG. 3, the entire pressure supply unit 9 with the pump set 11, the pressure accumulator 21 and the control device 22 is flanged together in one unit 33 which also contains the back pressure valve shown in FIG. 2, the pressure control switch 23 and possibly also the bleeder valve 24. A forked output line 25 leads from this component 33 to the brake application cylinders 34 of two disk brakes 35 which are associated with the wheels, provided with pneumatic collars on both sides, of one vehicle axle. The output line 25 can branch off to additional brake application cylinders 34 which are associated with the disk brakes of the wheels of the second vehicle axle of the bogie, shown in FIG. 3 by way of example as bogie 4 with the bogie frame 4a. In addition, the pressure supply line 18 leads from the unit to the pressure accumulator 27 and to the control device 28 configured as a conventional level control valve. The level control valve is controllable by a lever 36 projecting substantially horizontally in the usual fashion from the vertical distance between the bogie frame 4a and the vehicle casing 8. The back pressure line 32 leads from the level control valve (control device 28) back to the unit 33. The output lines 31 connect the level control valve with hydraulic suspension cylinders 37 which are arranged between the bogie frames 4a and the vehicle casing 8. Use of such conventional unit 33 results in an arrangement especially favorable in cost and construction.

What is claimed is:

1. Railroad bogie vehicle with electrohydraulic brakes (19) and hydropneumatic, leveling suspension (20), comprising a plurality of bogies (4, 5) each having a hydraulic pressure supply unit (9) from which pressure is supplied through parallel pressure control valves (15, 16) to both said electrohydraulic brakes (19) and said hydropneumatic suspension (20) of each of said bogies (4, 5), said pressure control valves being back pressure valves (15, 16) closing in the direction of flow to said pressure supply unit (9), and further comprising a pressure accumulator (21, 27) allocated to one of said electrohydraulic brake (19) and said hydropneumatic suspension (20) of said bogie (4, 5) and arranged downstream of said pressure control valves (15, 16).

2. Bogie vehicle according to claim 1, comprising a pressure control switch (23, 29) allocated to each pressure accumulator (21, 27) for turning on and off a pump set (11) associated with said pressure supply unit (9).

3. Bogie according to claim 2, wherein said pressure control switch (23) allocated to said pressure accumulator (21) for said electrohydraulic brake (19) has a lower cut-in pressure for said pump set (11) than said pressure control switch (29) allocated to said pressure accumulator (27) for said hydropneumatic suspension (20), and wherein the cut-off pressures of both pressure control switches (23 and 29) are at least approximately the same.

4. Bogie vehicle according to claim 1, 2 or 3, wherein the pressure supply unit (9) of each bogie (4,5) has a pressureless hydraulic tank (10) common to said electrohydraulic brake (19) and said hydropneumatic suspension (20), hydraulic back pressure lines (26, 32) of said brakes and said suspension debouching into said hydraulic tank.

5. Bogie vehicle according to claim 1, comprising a manually actuatable bleeder valve (24, 30) associated with each pressure accumulator (21,27) for drainage of said pressure accumulator (21, 27) into a hydraulic tank (10).

6. Bogie vehicle according to claim 1, 2, 3 or 5, wherein said hydraulic pressure supply unit (9) with a control device (22) for said electrohydraulic brake (19) and said pressure control valve (15) associated with said electrohydraulic brake are combined into a single unit (33).

7. Bogie vehicle according to claim 6, wherein said single unit further incorporates said pressure switch (23) and bleeder valve (24).

* * * * *